United States Patent
Chauhan et al.

(10) Patent No.: US 10,885,038 B2
(45) Date of Patent: Jan. 5, 2021

(54) SYSTEM AND METHOD FOR ADAPTIVE INFORMATION STORAGE MANAGEMENT

(71) Applicant: Cognizant Technology Solutions India Pvt. Ltd., Chennai (IN)

(72) Inventors: Harish Chauhan, Bangalore (IN); Jasjit Singh Hari, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 220 days.

(21) Appl. No.: 16/121,251

(22) Filed: Sep. 4, 2018

(65) Prior Publication Data
US 2020/0012649 A1 Jan. 9, 2020

(30) Foreign Application Priority Data
Jul. 3, 2018 (IN) .............................. 201841024775

(51) Int. Cl.
*G06F 16/2455* (2019.01)
*G06F 9/50* (2006.01)
(Continued)

(52) U.S. Cl.
CPC ...... *G06F 16/24568* (2019.01); *G06F 3/0655* (2013.01); *G06F 9/5016* (2013.01);
(Continued)

(58) Field of Classification Search
CPC ...... G06F 3/067; G06F 9/5016; G06F 16/122; G06F 16/24568; G06F 3/0655; G06F 16/213
See application file for complete search history.

(56) References Cited

U.S. PATENT DOCUMENTS 5,142,674 A * 8/1992 Barker ................. G06F 40/123
707/696
6,457,017 B2 9/2002 Watkins
(Continued)

FOREIGN PATENT DOCUMENTS

WO 2018051096 A1 3/2018

OTHER PUBLICATIONS

Lei Zhou, et al., "Schema Evolution for Real-Time Object-Oriented Databases", Internet URL: (https://pdfs.semanticscholar.org/4a8d/a370b7b81c09e1ae5e0ff780ce880abebe57.pdf); Department of Electrical Engineering and Computer Science; The University of Michigan; USA, Mar. 1994, 20 pp.

*Primary Examiner* — Marc S Somers
(74) *Attorney, Agent, or Firm* — Cantor Colburn LLP

(57) ABSTRACT

A system and a method for adaptive information storage management is provided. One or more parameters from an incoming data stream is identified based on a set of predetermined rules. The identified parameters correspond to a set of predetermined parameters. A subset of rules is applied, from the set of predetermined rules, on the incoming data stream. The subset of rules represent a series of iterative rules associated with each identified parameter. One or more data storage allocation files are generated that represent results of application of the set of predetermined rules and the subset of rules. The results include at least a storage system type identified from the storage system as optimal for storing the incoming data stream.

29 Claims, 6 Drawing Sheets

Figure 1:
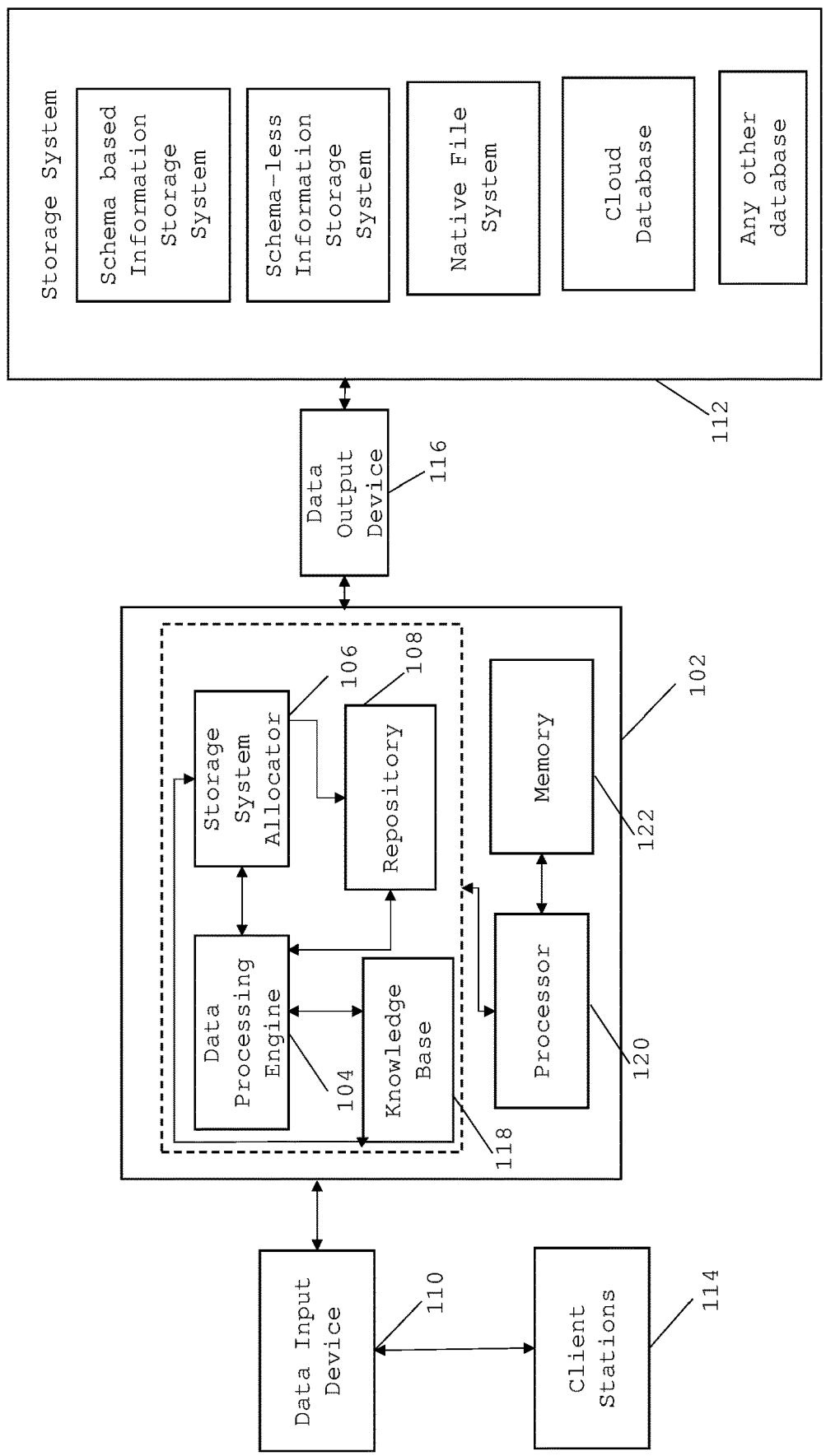

(51) Int. Cl.
*G06F 16/21* (2019.01)
*G06F 3/06* (2006.01)
*G06F 16/215* (2019.01)
*G06F 16/22* (2019.01)

(52) U.S. Cl.
CPC .......... *G06F 16/213* (2019.01); *G06F 16/215* (2019.01); *G06F 16/2272* (2019.01); *G06F 16/24565* (2019.01)

(56) References Cited

U.S. PATENT DOCUMENTS

| | | | |
|---|---|---|---|
| 7,730,034 B1* | 6/2010 | Deflaux | G06F 16/25 |
| | | | 707/654 |
| 7,913,053 B1* | 3/2011 | Newland | G06Q 10/107 |
| | | | 173/165 |
| 7,958,097 B1* | 6/2011 | Tormasov | G06F 16/1737 |
| | | | 707/694 |
| 9,760,571 B1* | 9/2017 | Ben-Natan | G06F 16/93 |
| 2002/0111956 A1* | 8/2002 | Yeo | G06F 16/134 |
| 2005/0021915 A1* | 1/2005 | Lowe | G06F 3/0631 |
| | | | 711/154 |
| 2007/0083482 A1* | 4/2007 | Rathi | G06F 16/182 |
| 2007/0130232 A1* | 6/2007 | Therrien | G06F 8/71 |
| 2007/0143327 A1* | 6/2007 | Rivas | G06F 16/24526 |
| 2014/0095231 A1* | 4/2014 | Cherusseri | G06Q 10/063 |
| | | | 705/7.11 |
| 2015/0052205 A1* | 2/2015 | Svoboda | H04L 67/1097 |
| | | | 709/206 |
| 2016/0042015 A1* | 2/2016 | Landau | G06F 16/951 |
| | | | 707/803 |
| 2017/0032016 A1 | 2/2017 | Zinner | |
| 2017/0235713 A1 | 8/2017 | Martensson | |

\* cited by examiner

SYSTEM AND METHOD FOR ADAPTIVE INFORMATION STORAGE MANAGEMENT

CROSS REFERENCE TO RELATED APPLICATION

This application is related to and claims the benefit of Indian Patent Application Number 201841024775 filed on Jul. 3, 2018, the contents of which are herein incorporated by reference in their entirety.

FIELD OF THE INVENTION

The present invention relates generally to information management systems. More particularly, the present invention relates to a system and method for an adaptive information management system which optimally determines and allocates storage systems to incoming data.

BACKGROUND OF THE INVENTION

Information management is critical for application developers as storing and retrieving digital information is increasingly becoming a humungous task owing to increase in data and demand for quick retrieval of data. Conventionally, application developers invest a lot of time on deciding the manner in which digital information is to be stored based on specific requirements. Further, developers engage with database teams of enterprises to provide information on the type of database to be used, the structure of the database, and the data type which is most suitable for particular data fields. Further, the manner in which database is to be normalized and the data fields which are to be used for searches, etc. are also aspects which need to be assessed and is very time consuming. Also, in some cases it is not known which additional fields may be added in future and whether to use schema-less or schema-based information storage systems, which results in inefficiency.

In light of aforementioned drawbacks, there is a need of a system and method which optimizes the process of data storage. Further, there is a need for a system and method which provides for an adaptive information management system which has the capability to automatically assess and implement requirements for storing data effectively without any human intervention.

SUMMARY OF THE INVENTION

A computer-implemented method for adaptive information storage management is provided. The method is implemented by a system which receives a data stream from at least one client station. The system is coupled to a storage system. The method comprises identifying one or more parameters from an incoming data stream based on a set of predetermined rules. The identified parameters correspond to a set of predetermined parameters. The method further comprises applying a subset of rules, from the set of predetermined rules, on the incoming data stream. The subset of rules represent a series of iterative rules associated with each identified parameter. Further, the method comprises generating one or more data storage allocation files representing results of application of the set of predetermined rules and the subset of rules. The results include at least a storage system type identified from the storage system as optimal for storing the incoming data stream.

A system for adaptive information storage management is provided. The system is coupled to a storage system and receives a data stream from at least one client station. The system comprises a memory storing program instructions and a processor for executing program instructions stored in a memory. The system further comprises a data processing engine. The data processing engine, is in communication with the processor and is configured to identify one or more parameters from an incoming data stream based on a set of predetermined rules. The identified parameters correspond to a set of predetermined parameters. The data processing engine is further configured to apply a subset of rules, from the set of predetermined rules, on the incoming data stream. The subset of rules represent a series of iterative rules associated with each identified parameter. Further, the data processing engine is configured to generate one or more data storage allocation files representing results of application of the set of predetermined rules and the subset of rules. The results include at least a storage system type that is identified from the storage system as optimal for storing the incoming data stream.

A computer program product is provided. The computer program product includes a non-transitory computer-readable medium having computer-readable program code stored thereon, the computer-readable program code comprising instructions that, when executed by a processor, causes the processor to identify one or more parameters from an incoming data stream based on a set of predetermined rules. The identified parameters correspond to a set of predetermined parameters. Further, the processor is caused to apply a subset of rules, from the set of predetermined rules, on the incoming data stream. The subset of rules represent a series of iterative rules associated with each identified parameter. Finally, the processor is caused to generate one or more data storage allocation files representing results of application of the set of predetermined rules and the subset of rules. The results include at least a storage system type that is identified from the storage system as optimal for storing the incoming data stream.

BRIEF DESCRIPTION OF THE ACCOMPANYING DRAWINGS

Figure 2:
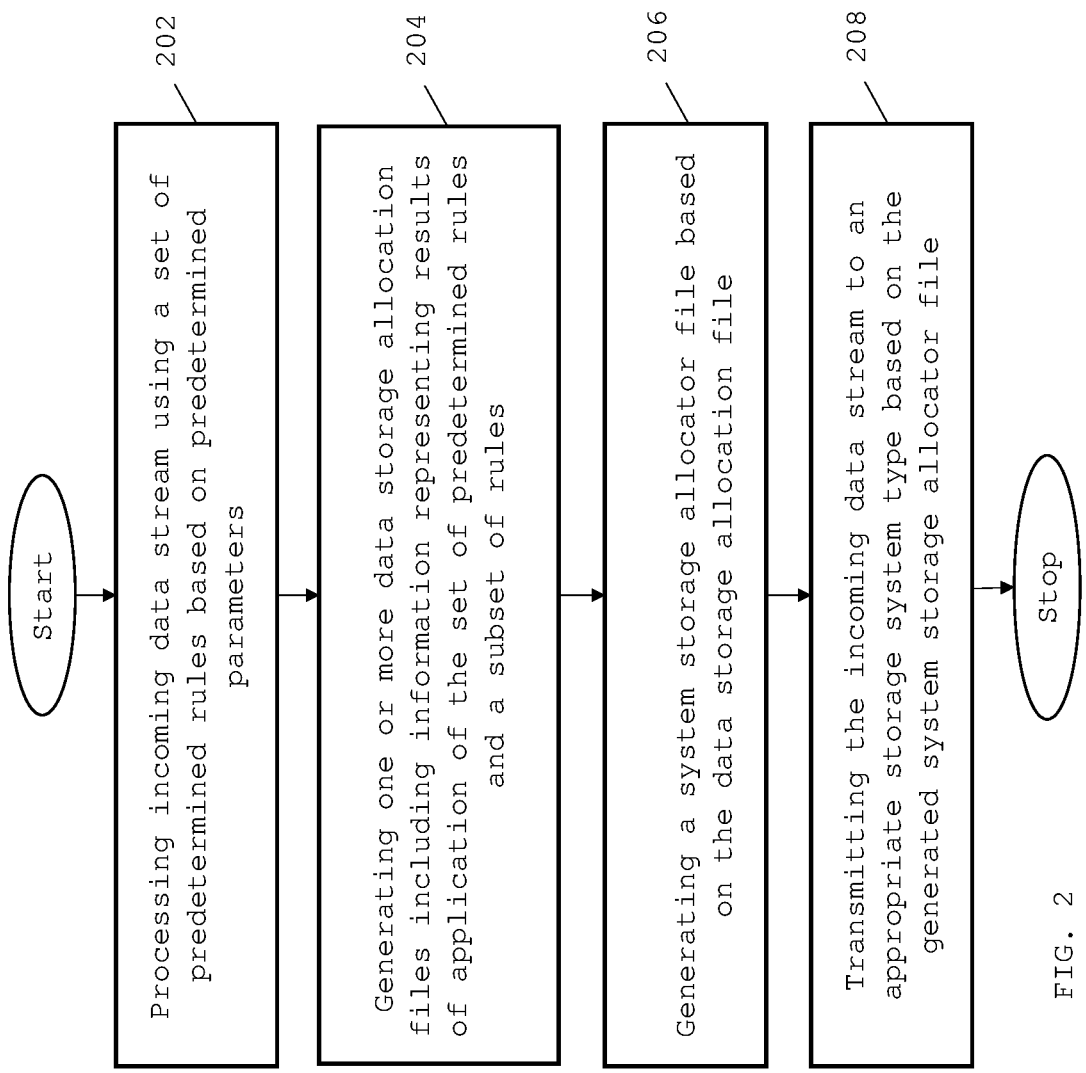
Figure 2A:
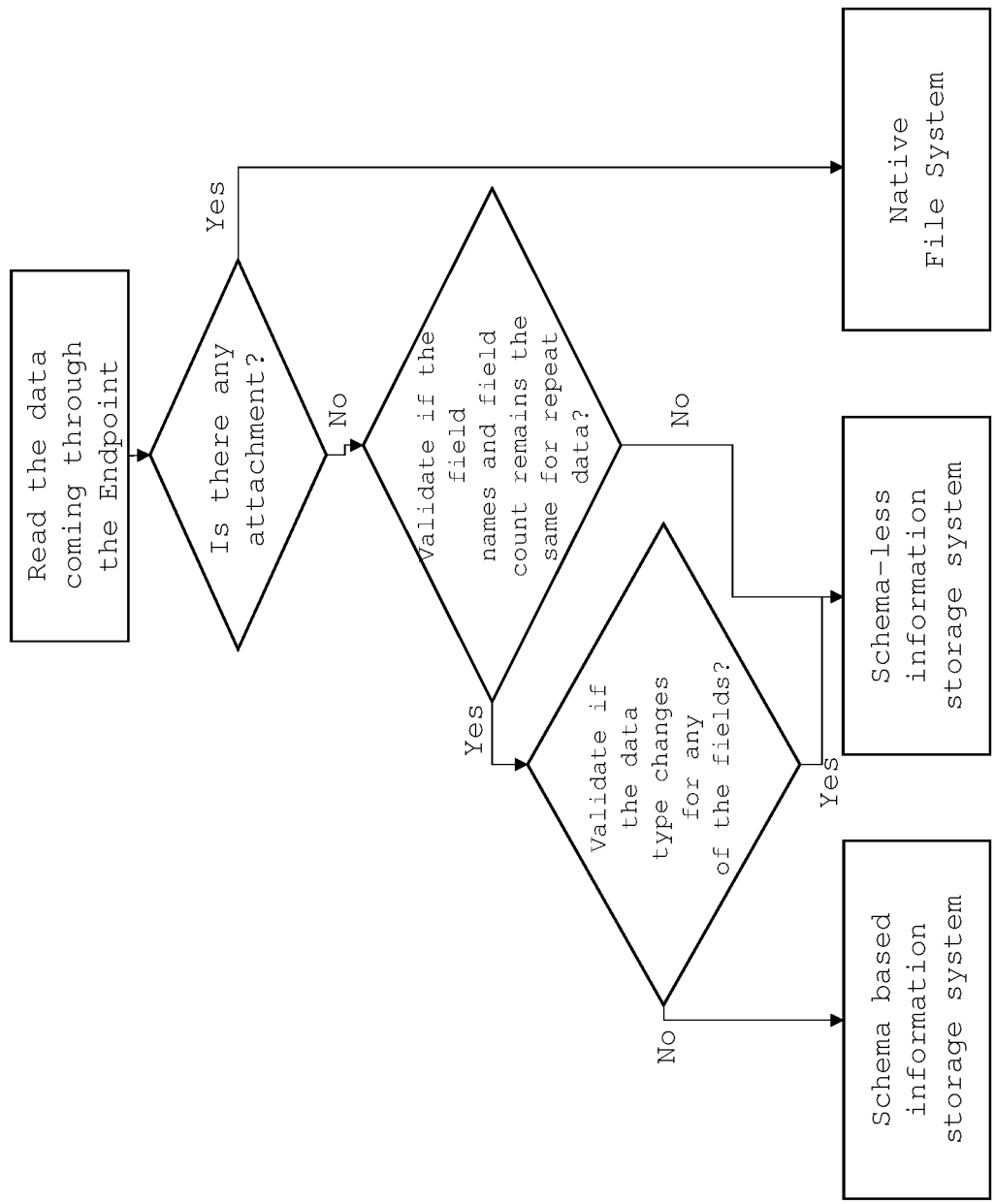
Figure 2B:
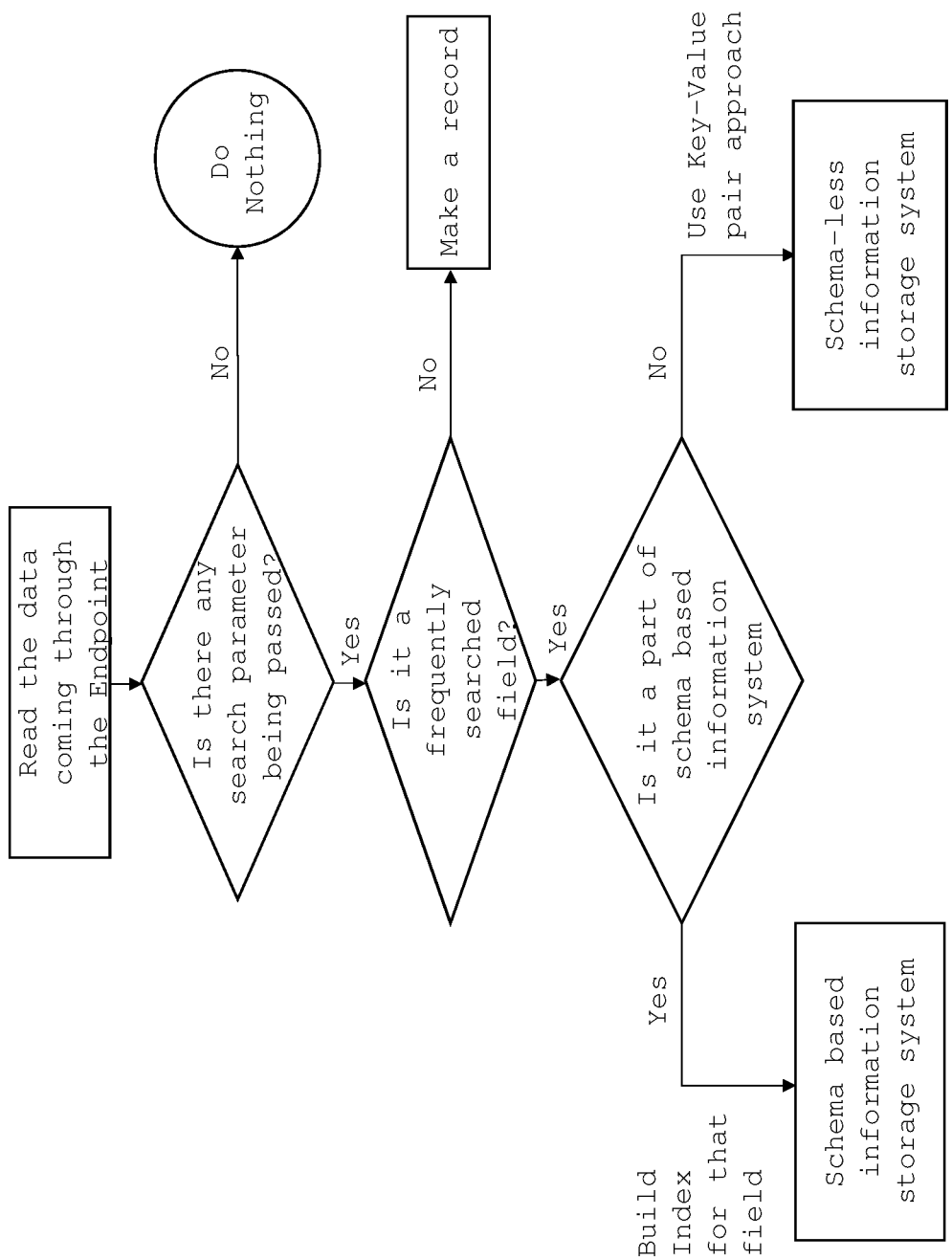
Figure 2C:
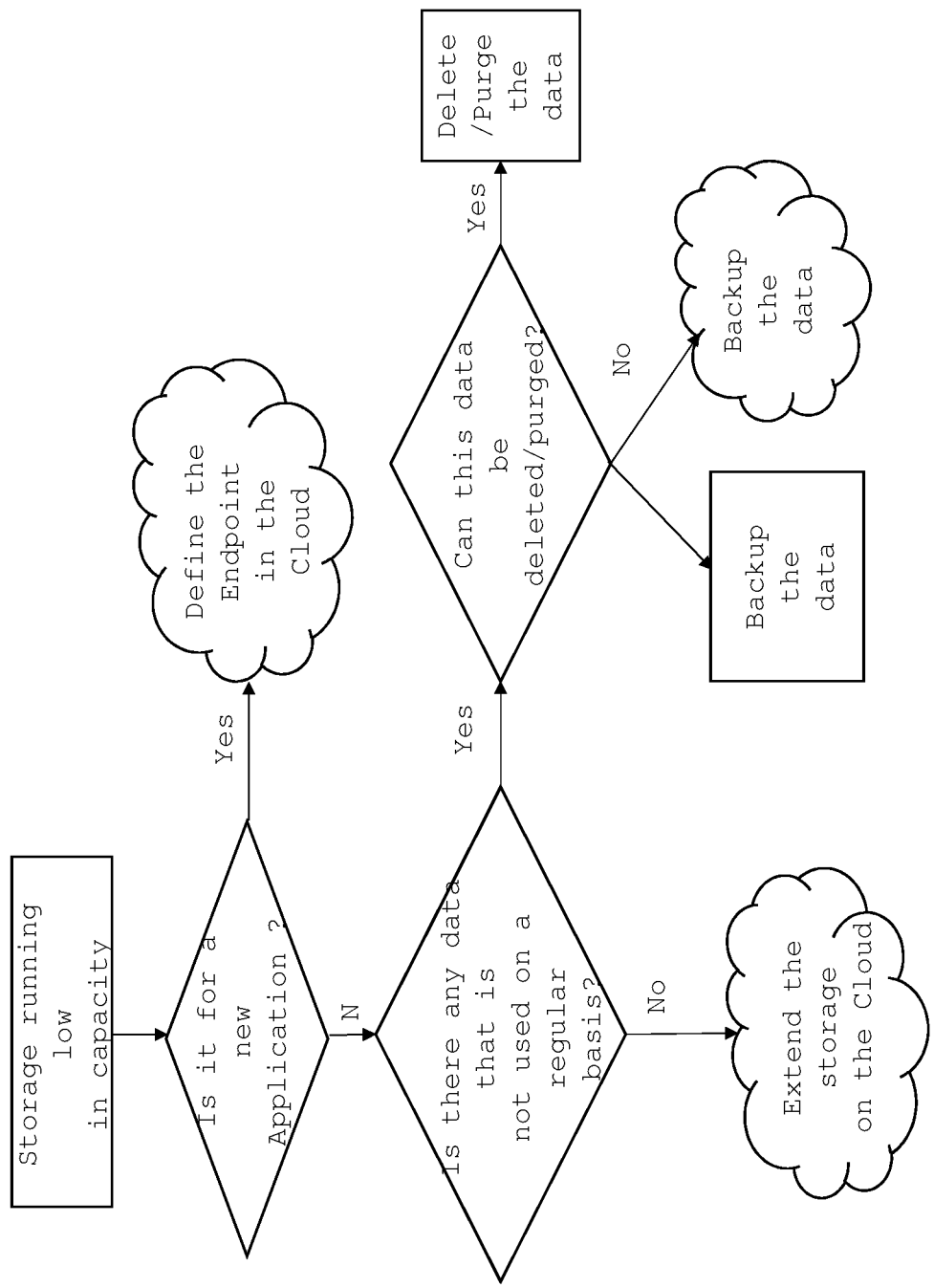
Figure 3:
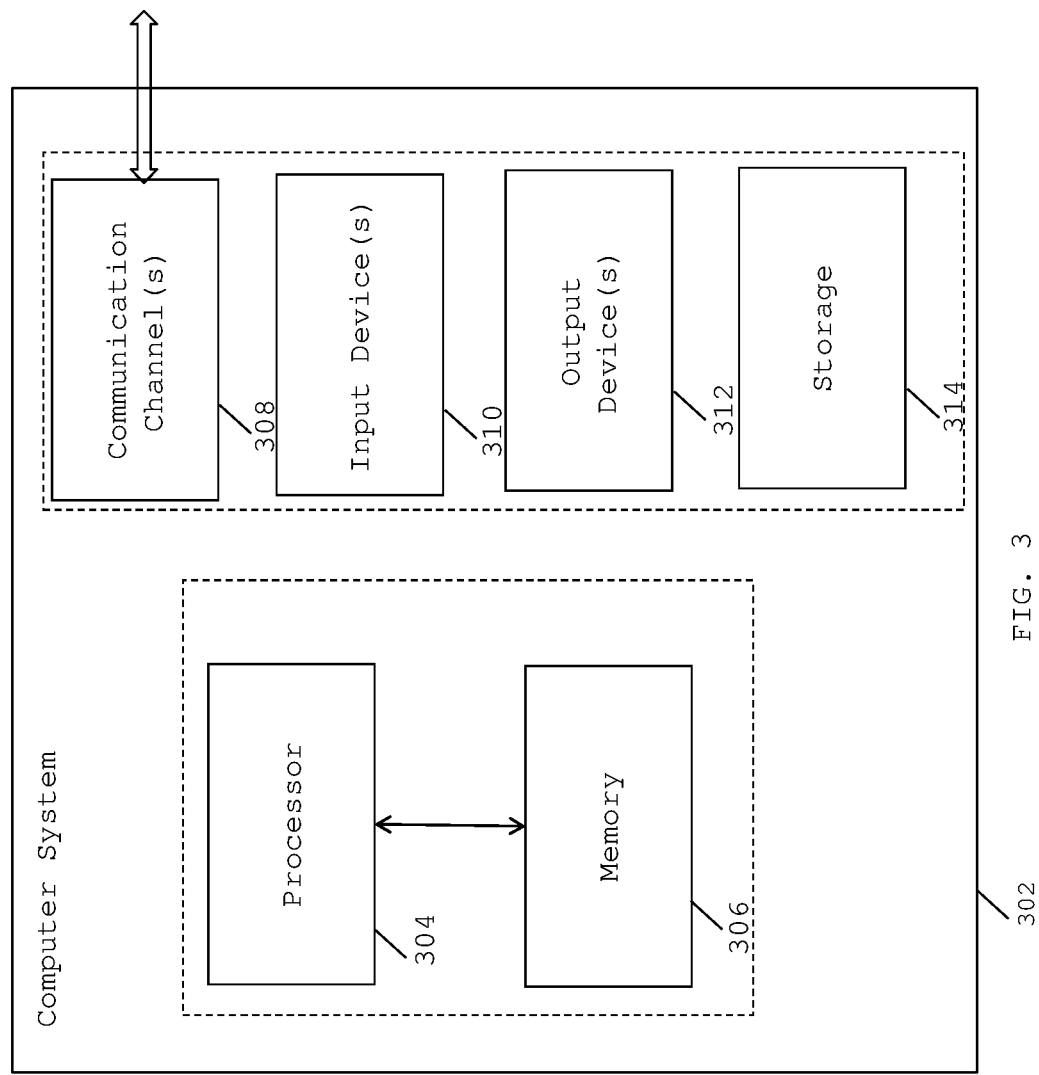

The present invention is described by way of embodiments illustrated in the accompanying drawings wherein:

FIG. 1 illustrates a block diagram of a system for adaptive information storage management, in accordance with various embodiments of the present invention;

FIGS. 2, 2a, 2b, and 2c are flowcharts illustrating a method for adaptive information storage management, in accordance with various embodiments of the present invention; and FIG. 3 illustrates an exemplary computer system in which various embodiments of the present invention may be implemented.

DETAILED DESCRIPTION OF THE INVENTION

A system and method for adaptive information storage management is provided. The invention provides for a self-organizing and a self-optimizing information management system which has a built-in-intelligence mechanism for analyzing incoming data, learning patterns of incoming data, and decision making for providing faster information storage and retrieval. The invention provides for a system and method which may be implemented as an independent system or may be embedded into existing systems. The invention provides for a mechanism which has the capability to perform optimal and efficient storage based on analysis of incoming data, and obviates the requirement for application developers to decide storage needs of data.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a block diagram of a system 102 for adaptive information storage management, in accordance with various embodiments of the present invention. The system 102 is in communication with a data input device 110 at one end and a storage system 112 at another end. The data input device 110 is in communication with one or more client stations 114. The system 102 is a self-organizing and self-optimizing tool which analyses incoming data based on predetermined parameters and automatically allocates data to one or more appropriate storage system type of the storage system 112. The one or more predetermined parameters is updated from time to time. The system 102 further comprises a data processing engine 104, a storage system allocator 106, a repository 108, and a knowledge base 118. In various embodiments of the present invention, the data processing engine 104, the storage system allocator 106, the repository 108, and the knowledge base 118 operates in conjunction with a processor 120 which executes instructions stored in a memory 122.

In an embodiment of the present invention, the system 102 receives data from the one or more client stations 114 through the data input device 110. In an exemplary embodiment of the present invention, the data input device 110 may be an application programming interface via which data from the client stations 114 is received by the system 102. In another exemplary embodiment of the present invention, the data input device 110 may include any interface via which data from the one or more client stations 114 is received and transmitted to the system 102. Examples of the interface may include, but is not limited to, ETHERNET cards, Small Computer System Interfaces (SCSIs), parallel data ports, serial data ports, fibre optic links, or any other wired or wireless links which is capable of exchanging data and signals between the client stations 114 and the system 102.

In an embodiment of the present invention, the system 102 communicates with the storage system 112 via a data output device 116. In an exemplary embodiment of the present invention, the data output device 116 may be an application programming interface via which data from the system 102 is received by the storage system 112. In another exemplary embodiment of the present invention, the data output device 116 may include any interface via which data from the system 102 is received and transmitted to an appropriate storage system type of the storage system 112. Examples of the interface may include, but is not limited to, ETHERNET cards, Small Computer System Interfaces (SCSIs), parallel data ports, serial data ports, fibre optic links, or any other wired or wireless links which is capable of exchanging data and signals between the system 102 and the storage system 112.

In an embodiment of the present invention, the storage system 112 includes multiple information storage systems, such as, a schema-based system, a schema-less based system, a native file system, cloud database and any other database system. Schema-based systems are storage systems with a fixed data structure. Examples of schema-based systems are Relational Database Management Systems (RDBMS), Customer Relationship Management (CRM) databases, Enterprise Resource Planning (ERP) databases, and financial databases. Schema-less based systems are storage systems without a fixed data structure which is modifiable and which may be changed as per requirement. Examples of schema-less based system include, but is not limited to, non-relational databases such as a NoSQL database, and public blog sites, social networking websites, professional connect related websites, and other database engines designed to handle unstructured data. In an example, the native file systems may be used for storing documents, images, audio files, video files, etc., which may be attachments of email communications or any other file which is transmitted over a network. In an exemplary embodiment of the present invention, the schema-based storage system, schema-less based storage system and native file system may be available as local resources. In another exemplary embodiment of the present invention, the schema-based system, schema-less based system and native file system may be available at remote locations.

In an embodiment of the present invention, the system 102 receives data from the one or more client stations 114, referred to as incoming data stream, via the data input device 110. The incoming data stream may include specific input data pattern including data of different type, size, format, count etc. The system 102 is configured to analyze the incoming data stream using a set of predetermined rules stored in the repository 108. The set of predetermined rules include rules that set out predetermined parameters on the basis of which the incoming data stream is analyzed by the system 102. Subsequent to the analysis performed by the system 102, the set of predetermined rules is updated by the system 102.

In particular, in an embodiment of the present invention, the data processing engine 104 receives the incoming data stream and processes the data stream using a set of predetermined rules retrieved from the repository 108. In an exemplary embodiment of the present invention, the set of predetermined rules are generated based on empirical study of data collected from prior experimentations, data collected from various enterprises and data collected based on learning pattern developed over a period of time. Further, the set of predetermined rules are generated and updated based on continual analysis of data captured for a predetermined time period. In various exemplary embodiments of the present invention, the set of predetermined rules may include rules that set out predetermined parameters including, but not limited to, the number of fields added, count of fields, type of data that are inserted such as, character, integer, float, and boolean, data type for each field, storage requirements, frequently searched fields etc. The data processing engine 104 applies the rules from the set of predetermined rules on the incoming data streams and generates one or more data storage allocation files. The data storage allocation files indicate an appropriate storage system type from the storage system 112 for storing the incoming data stream. The data processing engine 104 then invokes the storage system allocator 106 and transmits the data storage allocation files to the storage system allocator 106.

In operation, in an exemplary embodiment of the present invention, the data processing engine 104 reads the incoming data stream received via the data input device 110, and analyzes the data using one or more cognitive computing techniques. Examples of cognitive computing techniques include, but is not limited to, machine learning techniques, pattern recognition techniques, natural language processing techniques, graph theory and deep learning techniques. The knowledge base 118 stores semantic data obtained based on empirical study of various documents of multiple enterprises. The data processing engine 104 analyzes the data stream using one or more of the cognitive computing techniques by performing a keyword based search using the semantic data stored in the knowledge base 118. The data processing engine 104 retrieves the set of predetermined rules from the repository 108 and applies the predetermined set of rules on the analysed data stream to identify parameters that correspond to the set of predetermined parameters. The data processing engine 104 then applies a subset of rules from the set of predetermined rules which are associated with the identified parameters of the incoming data stream to perform decision making functions. The subset of rules represent a series of iterative rules associated with each identified parameter of the incoming data stream. The subset of rules are generated and updated continually on the basis of the learning that takes place each time an incoming data stream is processed by the system 102. The predetermined set of rules and the subset of rules are explained illustratively in the following paragraphs.

In an example, the data processing engine 104 applies the set of predetermined rules on the data stream to check a predetermined parameter, such as, a file attachment. If an attachment file is found, the data processing engine 104, generates a data storage allocation file indicating that the attachment file is to be stored in a native file system. If an attachment file is not found, the data processing engine 104 applies a first rule from the set of predetermined rules to identify if the data stream is the same as any of the previous data stream. If it is identified that the data stream is the same as a previous data stream, a second rule from the set of predetermined rules is applied to check if the field names and the field count is the same as that of a previous data stream. If it is found that the field name and field count of the data stream is not the same as the field name and field count of the previous data stream, the data processing engine 104 generates the data storage allocation file to indicate that the stream is to be allocated to a schema-less information storage system. Further, if it is found that the field name and field count of the data stream is the same as the field name and field count of the previous data stream, the data processing engine 104 applies a third rule from the set of predetermined rules to check if the data type of any of the fields of the data stream is the same as that of a previous data stream. Further, if it is found that the data types of all the fields remain the same, the data processing engine 104 generates the data storage allocation file to indicate that the stream is to be allocated to a schema-based information storage system. If it is found that the data type changes for any of the particular fields, the data processing engine 104 generates the data storage allocation file to indicate that the stream is to be allocated to a schema-less information storage system. In this example, the third rule from the set of predetermined rules causes a switch of data stream from a schema-based information storage system to a schema-less information storage system when a change is identified in any of a data type in a particular data field between a previous data stream and the incoming data stream. The message instructing a switch over is included in the data storage allocation file for transmission to the storage system allocator 106. Further, application of the third rule to generate a data storage allocation file to indicate storage of the incoming stream to a schema-less information storage system automatically triggers a fourth rule from the set of predetermined rules to initiate data migration from schema-based information storage system to scheme-less information storage system. In an exemplary embodiment of the present invention, for data migration from schema-less storage system to schema-based storage system, the data in the schema-less storage system is exported out. A schema is then created in the schema-based storage system and thereafter the exported data is loaded in the schema-based storage system. The data migration from schema-less storage system to schema-based storage system takes place in a uni-directional manner.

Further, application of the third rule to generate a data storage allocation file to indicate storage of the incoming stream to a schema-less information storage system automatically triggers a fifth rule to monitor the data stream for a predetermined period of time. The data processing engine 104 operates on the data stream to add new fields corresponding to the detected change. The data processing engine 104 may also incorporate correct data in the corresponding field, for instance, the data processing engine 104 incorporates an integer value in an integer field if it is found to be placed in a field for numeric data. The data processing engine 104 then checks and updates the data storage allocation file to indicate a switch back to the schema-based information storage system.

In another example, the data processing engine 104 applies the set of predetermined rules on the data stream to check a predetermined parameter, such as, presence of search parameters. If it is found that the search parameters exist, the data processing engine 104 applies a first rule to check if a frequently searched field exists. If a frequently searched field is found not to exist, a record is generated indicating the type of data stream which is without any frequently searched field. If it is found that the search fields do exist, a second rule is applied to check if the data is part of data stored in schema-based information storage system. If the data is found to be a part of the schema-based information storage system, the data processing engine 104 generates a data storage allocation file for a schema-based information storage system indicating the data stream, frequently searched fields and a message for creating an index for a particular field. If the data is not found to be a part of the schema-based information storage system, the data processing engine 104 generates a data storage allocation file for a schema-less information storage system indicating the data stream, frequently searched fields and a message for using a key-value pair approach for a faster search of the data fields.

In yet another example, the data processing engine 104 applies the set of predetermined rules on the data stream to check a predetermined parameter, such as, storage capacity issues. If it is found that storage capacity is low, the data processing engine 104 applies a first rule to check if the data stream corresponds to a new application. If the data is found to correspond to a new application, the data processing engine 104 generates a data storage allocation file that defines an end-point of a cloud database for storing the data corresponding to the new application. If it is found that the data does not correspond to a new application, a second rule is applied to identify if there is any existing data that is not used on a regular basis. If it is found that there is no such data that is not used on a regular basis, the data storage allocation file is generated to include a message for extending storage on the cloud database. If it is found that there are some data which are not used on regular basis, the data processing engine 104, applies a third rule from the set of predetermined rules to check if the data that is not used on the regular basis can be removed or purged. If it is found that the data may be purged, the data storage allocation file is generated to include a message for removing or purging such data. If it is found that the data may not be purged, a fourth rule is generated to create a backup of the data. The data storage allocation file is generated including a message to create a backup of the data in an appropriate storage system type of the storage system 112.

In an embodiment of the present invention, the data processing engine 104 transmits the data storage allocation files that are generated to the system storage allocator 106. The system storage allocator 106 receives and processes the data storage allocation files and creates a system storage allocator file. In an exemplary embodiment of the present invention, the system storage allocator file may include information in a tabular format including multiple rows and columns. The columns may include headers, such as, 'type of data stream' and the corresponding identified appropriate 'storage system type'. The rows include information associated with the 'type of data stream' and the 'storage system type'. Based on the storage allocator file, the storage system allocator 106 transmits the data to the identified storage system type of the storage system 112. The storage system allocator 106 contains information related to each of the storage system 112, including, but not limited to, addresses at which data is currently stored, various characteristics of the stored data, specified data management preferences, etc. The storage system allocator 106 transmits data to the identified storage system type of the storage system 112 based on the information present in the storage system allocator 106. In various embodiments of the present invention, by default, any new incoming data is stored in a schema-less information storage system, and the incoming data is migrated to the most appropriate storage system type based on the information provided in the storage allocator file. The storage system identified as the most appropriate storage system type in the storage allocator file is the optimal storage system for the incoming data. In an embodiment of the present invention, the storage allocator 106 may make any required changes to the content of the data storage allocation files for creating the storage allocation file. The changes to the content of the data storage allocation files are then stored in the knowledge base 118. Each time the storage allocator 106 makes any changes to the content of data storage allocation files associated with corresponding incoming data stream, such changes are stored in the knowledge base 118. The changes identified by the storage allocator 106 stored in the knowledge base 118 forms a part of the learning of the system 102, and is used by the data processing engine 104 in analyzing the incoming data stream.

Advantageously, in accordance with various embodiments of the present invention, the system 102 is configured with a built-in intelligence mechanism which is capable of automatically taking right decisions for storage allocation by analysing incoming data and selecting and applying predetermined rules, which are updated based on learning patterns from time to time. The system 102 therefore provides for faster and efficient information storage and retrieval without any human intervention.

FIG. 2 is a flowchart illustrating a method for adaptive information storage management, in accordance with various embodiments of the present invention.

At step 202, incoming data stream is processed using a set of predetermined rules based on predetermined parameters. In various embodiments of the present invention, the incoming data stream is analysed to identify one or more parameters. The one or more parameters are identified from the incoming data stream based on a set of predetermined parameters. Examples of predetermined parameters include, but are not limited to, number of fields added, count of fields, type of data that is inserted such as, character, integer, float, and Boolean, data type for each field, storage requirements, frequently searched fields etc. In an embodiment of the present invention, the incoming data stream is analysed using one or more cognitive techniques to identify one or more parameters based on the set of predetermined parameters, using the set of predetermined rules. The set of predetermined rules is generated based on empirical study of data collected from various enterprises. Further, the set of predetermined rules is generated and updated based on continual analysis of data captured for a predetermined time period. Further, in an embodiment of the present invention, a subset of rules corresponding to the identified parameters are selected from the set of predetermined parameters and applied on the incoming data stream. The subset of rules represent a series of iterative rules associated with each identified parameter of the incoming data stream. The subset of rules are generated and updated continually on the basis of the learning that takes place each time an incoming data stream is processed. FIG. 2a is a flowchart which illustrates an exemplary method of application of rules from a predetermined set of rules where the identified predetermined parameter is a 'file attachment', in accordance with an exemplary embodiment of the present invention. FIG. 2b, is a flowchart which illustrates an exemplary method of application of rules from a predetermined set of rules where the identified predetermined parameter is 'presence of search parameters' in the incoming data stream, in accordance with another exemplary embodiment of the present invention. FIG. 2c, is a flowchart which illustrates an exemplary method of application of rules from a predetermined set of rules where the identified predetermined parameter is 'storage capacity', in accordance with yet another exemplary embodiment of the present invention. The methodology of application of rules in the flowcharts illustrated in FIGS. 2a, 2b and 2c are described in conjunction with the description provided for FIG. 1.

At step 204, one or more data storage application files are generated. In an embodiment of the present invention, the one or more data storage application files includes information representing results of application of the set of predetermined rules and the subset of rules. That is, based on the identified predetermined parameter and one or more rules applied on the incoming data stream from the set of predetermined rules, one or more data storage allocation files are generated. Further, the data storage application files are generated corresponding to each rule, from the set of predetermined rules, which is applied on the incoming data stream. Corresponding to each identified predetermined parameter, more than one rule may be applied from the set of predetermined rules. A data storage allocation file is generated indicating the appropriate storage system type as an outcome of the application of each rule.

At step 206, a system storage allocator file is generated based on the data storage allocation file. In an embodiment of the present invention, the system storage allocator file may include information in a tabular format including multiple rows and columns. The columns may include headers, such as, 'type of data stream' and the corresponding identified appropriate 'storage system type'. The rows include information associated with the 'type of data stream' and the 'storage system type'. In various embodiments of the present invention, the content and structure of the system storage allocator file varies based on the most optimal storage system identified on the basis of the information received via the data storage application files. Further, the system storage allocator file may also include changes made to the content of the data storage application files. The changes made include changes to the information associated with the 'type of data stream' and the 'storage system type'. The changes made to the content of the data storage are stored in the knowledge base 118.

At step 208, the incoming data stream is transmitted to an appropriate storage system type based on the generated system storage allocator file. In an embodiment of the present invention, based on the information in the storage allocator file, the incoming data stream is transmitted to the identified storage system type, which is appropriate for storing the data stream. For transmission, addresses of each of the storage system in the storage system 112 at which data is currently stored is accessed. Further, information including, but not limited to, various characteristics of stored data, and specified data management preferences are analysed for eventual transmission to the identified storage system type. In various exemplary embodiments of the present invention, the data stream is transmitted to the identified storage system type over existing IP network, well established channels such as application programming interfaces and connection strings.

FIG. 3 illustrates an exemplary computer system in which various embodiments of the present invention may be implemented, in accordance with various embodiments of the present invention.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer-implemented method for adaptive information storage management, wherein the method is implemented by a system receiving a data stream from at least one client station, the system is coupled to a storage system, the method comprising:

identifying one or more parameters from an incoming data stream based on a set of predetermined rules, wherein the identified parameters correspond to a set of predetermined parameters;

applying a subset of rules, from the set of predetermined rules, on the incoming data stream, wherein the subset of rules represent a series of iterative rules associated with each identified parameter, the series of iterative rules comprises:

applying a first rule to identify if the incoming data stream is the same as any of a previous data stream in an event the identified parameter is not found;

applying a second rule to check if field names and field counts associated with the incoming data stream is the same as that of the previous data stream if the data stream is found to be the same as any of the previous data stream; and applying a third rule to check if a data type of any of the fields of the incoming data stream is the same as that of the previous data stream if it is found that the field names and field counts of the incoming data stream are the same as the field names and field counts of the previous data stream;

and generating one or more data storage allocation files representing results of application of the set of predetermined rules and the subset of rules, wherein the results include at least a storage system type identified from the storage system as optimal for storing the incoming data stream.

2. The computer-implemented method of claim 1, wherein the method comprises generating a system storage allocator file based on the data storage application files, wherein the system storage allocator file includes information related to transmission of the incoming data stream to the identified storage system type.

3. The computer-implemented method of claim 1, wherein the incoming data stream is initially stored in a schema-less based information storage system and is transmitted to the identified storage system type based on the information in the data storage allocation file.

4. The method of claim 1, wherein the set of predetermined rules and the subset of rules is generated and updated based on a learning pattern developed on the basis of processing of various incoming data streams over a period of time.

5. The method of claim 1, wherein the application of the set of predetermined rules to identify one or more parameters that correspond to the set of predetermined parameters include identifying a file attachment.

6. The method of claim 5, wherein the generation of the one or more data storage allocation files includes generating a data storage allocation file indicating the identified storage system type as a native file system if the parameter file attachment is identified.

7. The method of claim 1, wherein applying the series of iterative rules comprises applying the rules if the identified parameter which is not found is a file attachment, the series of iterative rules further includes that if it is found that the field names and the field counts of the data stream are not the same as the field names and field counts of the previous data stream, a data storage allocation file is generated identifying the storage system type as schema-less based information storage system.

8. The method of claim 1, wherein applying the series of iterative rules comprises applying the rules if the identified parameter which is not found is a file attachment, the series of iterative rules further includes that if it is found that the data types of all the fields remain the same, a data storage allocation file is generated identifying the storage system type as schema-based information storage system.

9. The method of claim 1, wherein applying the series of iterative rules comprises applying the rules if the identified parameter which is not found is a file attachment, the series of iterative rules further includes that if it is found that the data type changes for any of the particular fields, a data storage allocation file is generated identifying the storage system type as schema-less based information storage system.

10. The method of claim 1, wherein applying the series of iterative rules comprises applying the rules if the identified parameter which is not found is a file attachment, the application of the third rule invokes generation of a data storage application file identifying the storage system type as schema-less information storage system.

11. The method of claim 1, wherein the application of the third rule triggers application of a fourth rule to initiate data migration from schema-based information storage system to schema-less information storage system.

12. The method of claim 1, wherein the application of the third rule triggers application of a fifth rule to add new fields, incorporate correct data in the corresponding fields, and monitor the incoming data stream for a predetermined period of time.

13. The method of claim 12, wherein the data storage application file may be generated to indicate a message for switching back to the schema-based information storage system from the schema-less information storage system.

14. The method of claim 1, wherein application of the set of predetermined rules to identify one or more parameters that correspond to the set of predetermined parameters include identifying storage capacity issues.

15. The method of claim 14, wherein applying the subset of rules includes applying a series of iterative rules if the identified parameter of storage capacity is found to be low, the series of iterative rules including:

applying a first rule to check if the data stream corresponds to a new application;

applying a second rule to identify if there is any existing data that is not used on a regular basis if it is found that the data does not correspond to a new application;

applying a third rule to check if the data that is not used on the regular basis can be removed or purged if it is found that data which are not used on a regular basis exists; and applying a fourth rule to create a backup of the data if it is found that the data may not be purged.

16. The method of claim 15, wherein if the data is found to correspond to a new application, a data storage allocation file is generated identifying the storage type as a cloud database, the data storage allocation file indicating the end-point of the cloud database.

17. The method of claim 15, wherein if the data is not found to be used on a regular basis, a data storage allocation file is generated including a message to extend storage on the cloud database.

18. The method of claim 15, wherein if the data is found to be purged, a data storage allocation file is generated including a message to remove the data.

19. The method of claim 15, wherein if the data is not found to be purged, a data storage allocation file is generated including a message to create a backup of the data in an identified storage system type.

20. The method of claim 1, wherein the storage allocator file comprises information including addresses of currently stored data, various characteristics of the stored data, and specified data management preferences.

21. A computer-implemented method for adaptive information storage management, wherein the method is implemented by a system receiving a data stream from at least one client station, the system is coupled to a storage system, the method comprising:
identifying one or more parameters from an incoming data stream based on a set of predetermined rules, wherein the identified parameters correspond to a set of predetermined parameters;
applying a subset of rules, from the set of predetermined rules, on the incoming data stream, wherein the subset of rules represent a series of iterative rules associated with each identified parameter, the series of iterative rules comprises:
applying a first rule to check if a frequently searched field exists in an event the identified parameter includes presence of search parameters, wherein if the frequently searched field is not found a record is generated indicating a type of the data stream; and
applying a second rule to check if the data stream is part of data stored in a schema-based information storage system if the search fields are found
and
generating one or more data storage allocation files representing results of application of the set of predetermined rules and the subset of rules, wherein the results include at least a storage system type identified from the storage system as optimal for storing the incoming data stream.

22. The method of claim 21, wherein if the data stream is found to be a part of the schema-based information storage system, a data storage allocation file is generated identifying the storage type as a schema-based information storage system, the data storage allocation file indicating the data stream, frequently searched fields and a message for creating an index for a particular field.

23. The method of claim 22, wherein if the data stream is not found to be a part of the schema-based information storage system, a data storage allocation file is generated identifying the storage type as schema-less based information storage system, the data storage allocation file indicating the data stream, frequently searched fields and a message for using a key-value pair approach for searching the data fields.

24. A system for adaptive information storage management, wherein the system is coupled to a storage system and receives a data stream from at least one client station, the system comprising:
a memory storing program instructions;
a processor for executing program instructions stored in a memory;
a data processing engine, in communication with the processor and configured to:
identify one or more parameters from an incoming data stream based on a set of predetermined rules, wherein the identified parameters correspond to a set of predetermined parameters;
apply a subset of rules, from the set of predetermined rules, on the incoming data stream, wherein the subset of rules represent a series of iterative rules associated with each identified parameter, the series of iterative rules comprises:
applying a first rule to identify if the incoming data stream is the same as any of a previous data stream in an event the identified parameter is not found;
applying a second rule to check if field names and field counts associated with the incoming data stream is the same as that of the previous data stream if the data stream is found to be the same as any of the previous data stream; and
applying a third rule to check if a data type of any of the fields of the incoming data stream is the same as that of the previous data stream if it is found that the field names and field counts of the incoming data stream are the same as the field names and field counts of the previous data stream; and
generate one or more data storage allocation files representing results of application of the set of predetermined rules and the subset of rules, wherein the results include at least a storage system type that is identified from the storage system as optimal for storing the incoming data stream.

25. The system of claim 24, wherein the system comprises a system storage allocator in communication with the processor and configured to generate a system storage allocator file based on the data storage application files, wherein the system storage allocator file includes information related to the transmission of the incoming data stream to the identified storage system type.

26. The system of claim 24, wherein the predetermined set of rules are stored in a repository and retrieved by the data processing engine, wherein the predetermined set of rules includes the subset of rules, the set of predetermined being updated based on a learning pattern developed by the system over a period of time on the basis of processing of various incoming data streams.

27. The system of claim 24, wherein the system comprises a knowledge base storing semantic data obtained based on empirical study of various documents of multiple enterprises, and wherein the data processing engine identifies the parameters in the incoming data stream using one or more cognitive computing techniques by performing a keyword based search using the semantic data stored in the knowledge base.

28. The system of claim 27, wherein the knowledge base is updated from time to time by the system storage allocator.

29. A computer program product comprising:
a non-transitory computer-readable medium having computer-readable program code stored thereon, the computer-readable program code comprising instructions that, when executed by a processor, causes the processor to:
identify one or more parameters from an incoming data stream based on a set of predetermined rules, wherein the identified parameters correspond to a set of predetermined parameters;
apply a subset of rules, from the set of predetermined rules, on the incoming data stream, wherein the subset of rules represent a series of iterative rules associated with each identified parameter, the series of iterative rules comprises:
applying a first rule to identify if the incoming data stream is the same as any of a previous data stream in an event the identified parameter is not found;
applying a second rule to check if field names and field counts associated with the incoming data stream is the same as that of the previous data stream if the data stream is found to be the same as any of the previous data stream; and applying a third rule to check if a data type of any of the fields of the incoming data stream is the same as that of the previous data stream if it is found that the field names and field counts of the incoming data stream are the same as the field names and field counts of the previous data stream;

and generate one or more data storage allocation files representing results of application of the set of predetermined rules and the subset of rules, wherein the results include at least a storage system type that is identified from the storage system as optimal for storing the incoming data stream.

\* \* \* \* \*